April 19, 1960   C. W. CHRISTMAN   2,933,122
METHOD OF MAKING CELLULAR CORE MATERIAL FROM FLUTED STOCK
Filed April 29, 1957   3 Sheets-Sheet 1
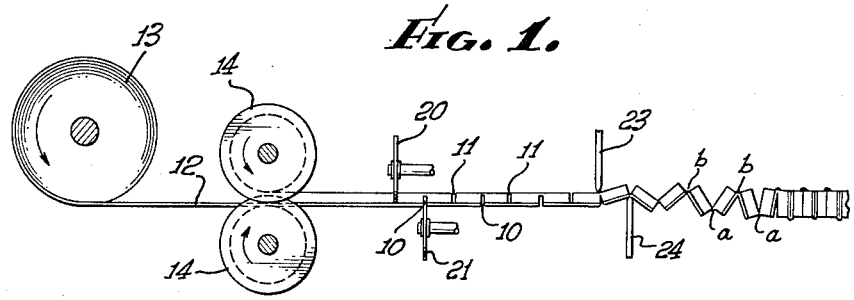
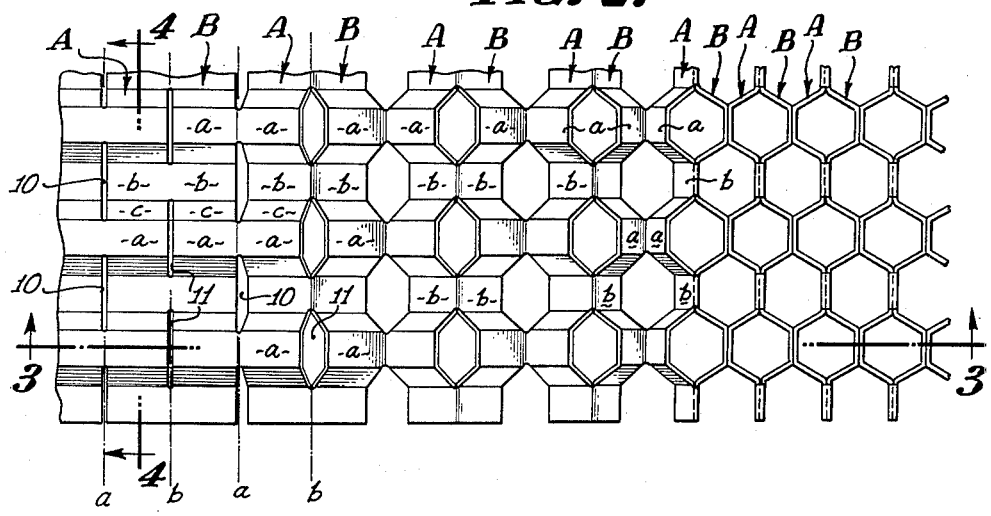
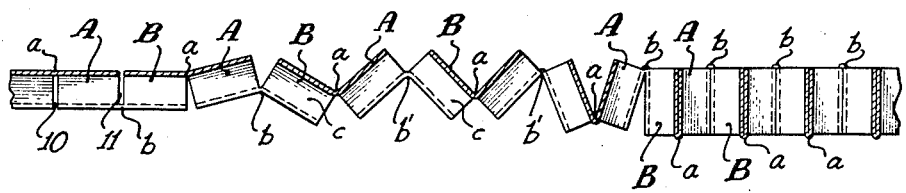
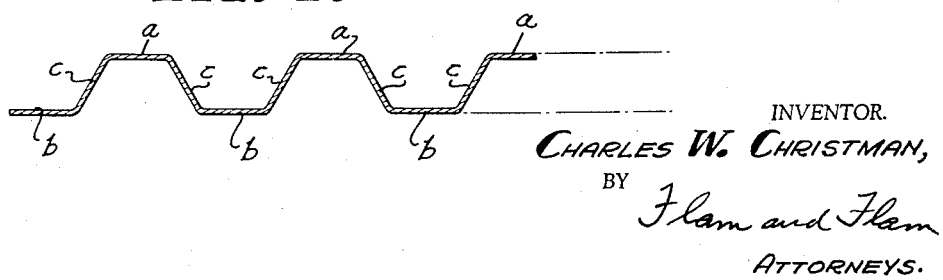
INVENTOR.
CHARLES W. CHRISTMAN,
BY
Flam and Flam
ATTORNEYS.

CHARLES W. CHRISTMAN,
INVENTOR.

BY Flam and Flam
ATTORNEYS.

April 19, 1960 C. W. CHRISTMAN 2,933,122
METHOD OF MAKING CELLULAR CORE MATERIAL FROM FLUTED STOCK
Filed April 29, 1957 3 Sheets-Sheet 3
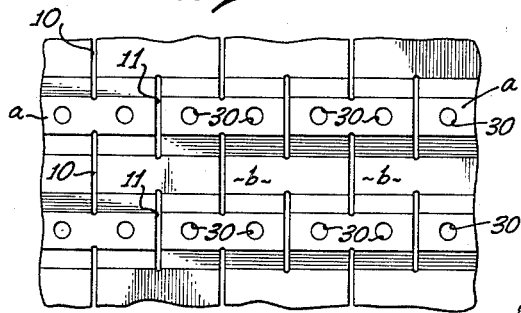
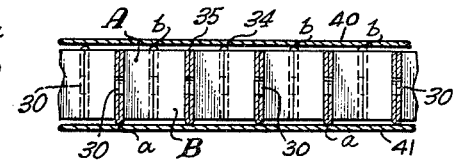
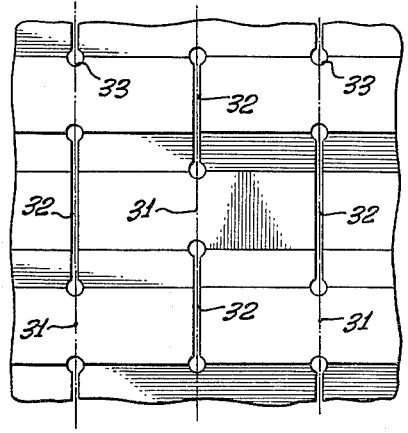
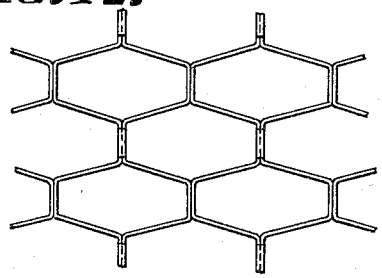
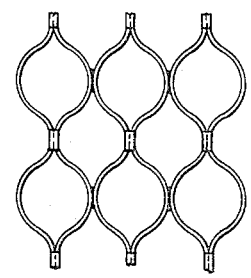
CHARLES W. CHRISTMAN,
INVENTOR.
BY Flam and Flam
ATTORNEYS.

United States Patent Office 2,933,122
Patented Apr. 19, 1960

2,933,122

METHOD OF MAKING CELLULAR CORE MATERIAL FROM FLUTED STOCK

Charles W. Christman, Los Angeles, Calif.

Application April 29, 1957, Serial No. 655,760

2 Claims. (Cl. 153—2)

This invention relates to a new cell core structure, and to the method of making the same.

Cell core material may be used in various applications in which light weight, uniformly distributed columnar-type supports or reinforcements are necessary or desirable. Such cellular material is particularly useful in airplane wing sections, and the like, the cellular material being sandwiched between the wing skin elements.

Various methods have heretofore been devised for providing cellular material of this type. Probably the earliest method involves welding of fluted strips together. While perfect welding may not be crucial, since the contemplated load does not depend upon the weld, nevertheless the manufacturing of cellular material in this fashion is tedious and expensive.

There has been developed a method wherein flat layers of metal are adhered together in juxtaposed relationship by a suitable material. The location of the adhered portions are staggered from layer to layer. The layers are expanded and a cellular configuration results since the layers yield and bend before the adhesive fails. Obviously, this method, although successfully used, has inherent limitations. Thus, if thick layers are required, the immediate problem is how to provide means fastening the layers together that will be strong enough to hold while the thick metal is bent. The secondary or companion problem is that very large machines would be required to perform the expanding operations.

In either process, cutting of strips is required at some stage, and the cellular material cannot be made in a continuous process from flat stock.

The primary object of this invention is to provide a new material which can be readily and economically manufactured.

Another object of this invention is to provide a new process for making cellular material in which: the wall thickness of the cellular material is no problem; welding or other operations for securing strips together is obviated; and in which it is unnecessary as a preparatory step to provide a series of flat or fluted separate strips.

A companion object is to provide a new process for manufacturing cellular material by a continuous process, that is, one in which flat stock from a supply roll is fed into progressive machinery and cellular material is supplied at the end in a continuous fashion.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Figure 1 is a diagrammatic view illustrating the process by the aid of which the new cell core structure is manufactured;

Fig. 2 is a top plan view of the cell core structure illustrating successive stages of its manufacture;

Figure 5:
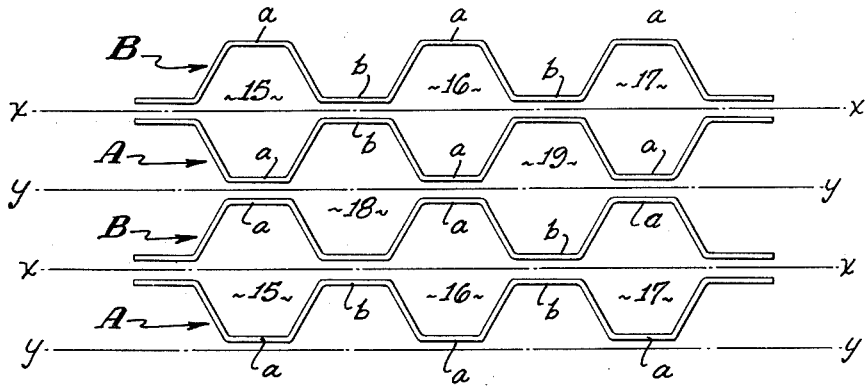
Figure 6:
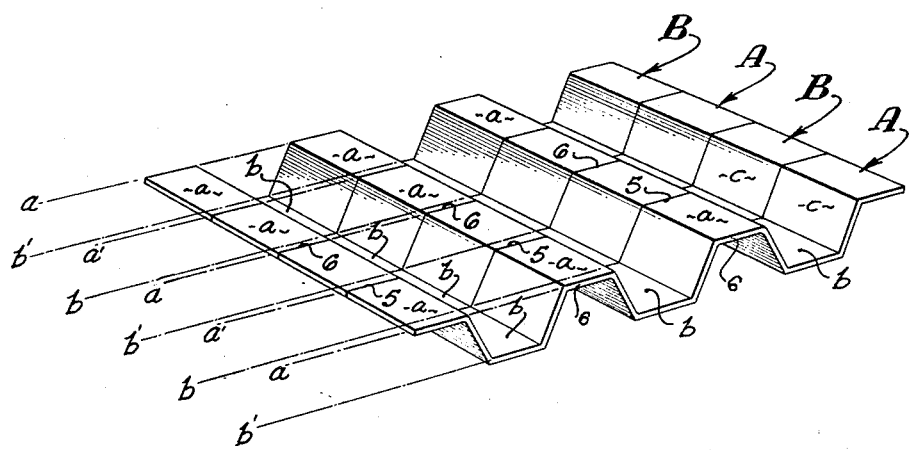

Figs. 3 and 4 are sectional views taken along planes indicated by lines 3—3 and 4—4 of Fig. 2;

Figs. 5 and 6 are diagrammatic views for purposes of explanation;

Fig. 7 is a plan view of a cell core structure just prior to the bending stages and illustrating the manner in which access openings are provided through the cell core material;

Fig. 8 corresponds to a longitudinal sectional view of the structure of Fig. 5, but after bending;

Fig. 9 is a fragmentary view of other cell core material in the process of manufacture just prior to the bending stage;

Fig. 10 is a longitudinal sectional view through the completed cell core material of Fig. 9; and Figs. 11, 12 and 13 are plan views illustrating respectively modified cell shapes and all made in accordance with the present invention.

Referring first to Figs. 5 and 6, the illustrative cell core material shown in Fig. 5, for example, comprises four identical fluted or channeled strips A, B, A, B, each having corresponding crests $a$ and troughs $b$. The strips A, B, A and B, shown edge-on, are placed in side-by-side relationship. Alternate strips A have their crests $a$ and troughs $b$ similarly oriented. The other alternate strips B have their crests $a$ and troughs $b$ similarly oriented, but in a manner reverse to that of the strips A. Thus, each strip comprises the mirror image of the previous strip, the plane of symmetry (or reflection) being the boundary plane $x$, $y$, $z$, etc. between the two strips forming the pairs AB, BA, AB, etc.

The crests $a$ of the strips A and B on opposite sides of the alternate planes $x$ define cellular spaces 15, 16, 17, while troughs $b$ of these strips back each other to form respectively halves of cellular spaces in staggered relationship with the spaces 15, 16, 17. Thus, the troughs $b$ of the strips B and A on opposite sides of the other alternate planes $y$ form cellular spaces 18, 19, while the crests $a$ of these strips back each other to form respectively halves of the cellular spaces 15, 16, 17 in staggered relationship with the spaces 18, 19.

The strips A, B, A, B may be made from unitary fluted stock material cut transversely, as illustrated in Fig. 6. To arrive at the configuration of Fig. 5 from the configuration of the strips as illustrated in Fig. 6, the alternate strips A are rotated 90° in one direction about a longitudinal axis, and the other alternate strips B are rotated 90° in the other direction about a longitudinal axis. This is equivalent to successive opposite 180° orientations of successive strips A, B, A, B or essentially an accordion fold.

Referring to Fig. 6, the strips A and B may be rotated in opposite directions to arrive at the Fig. 5 orientation as follows: the two outer boundary lines $b'$ of two adjacent strips A and B (which lines include an element of troughs $b$) move toward each other as the respective strips both fold or rotate about the intermediate dividing axis $b$ (which axis also includes an element of troughs $b$). The reference characters $b$ and $b'$ for these lines are used because the lines include elements of the troughs $b$. The crests $a$ of the two strips A, B separate from each other where they initially engaged, as at 5, and the remote ends of the crests $a$, as at 6, approach each other. Finally the lines $b'$ move into coincidence as the folding is completed. Since the crests $a$ of the strips A, B oppositely rotate about the folding axis $b$ which is skew to these crests $a$, the respective crests $a$ of the strip sets A, B are ultimately spaced from each other (see Fig. 5).

But the troughs $b$ of the strip sets A, B include the axis $b$, hence upon rotation, these troughs back each other (see Fig. 5).

Viewed in another fashion, top boundary lines $a'$ of the staggered strip sets BA move toward each other as the respective strips B and A fold or rotate about the dividing axis $a$. In this case, involving the staggered sets BA, the crests $a$ back each other whereas the troughs $b$ are spaced from each other (see Fig. 5).

By partially cutting integral fluted stock material in an appropriate manner, the configuration illustrated in Fig. 5 may be formed so that separate securing means between successive strips are obviated. Thus, considering the folding process just described in connection with Fig. 6, it is clear that since the axes of folding $a$ and $b$ include, respectively, common portions of the material of adjacent strips B and A or A and B before folding, the included portions need not be separated. Thus, since the axes $a$ include crests $a$ of adjacent strips, folding about the axes $a$ may be accomplished, providing the troughs $b$ in transverse alignment with the axes $a$ and the corresponding adjacent sides $c$ are cut.

Referring now to Figs. 3 and 4, there is illustrated integral stock material bearing reference characters corresponding to those shown and described in Figs. 5 and 6. The necessary cuts across the troughs $b$ for permitting folding along the axes $a$ are illustrated at 10, and the necessary cuts across crests $a$ for permitting folding along the axes $b$ are illustrated at 11.

Since the troughs and crests alternate, the successive groups of cuts 10, 11, 10, 11 are staggered.

The process by the aid of which the cellular material may be continuously formed will be readily understood by a consideration of Figs. 1 and 2.

Continuous flat stock material 12 passes from a supply drum 13 between a pair of forming rollers 14 which provide the transverse fluted configuration, as illustrated in Fig. 4.

At the next stage, the cuts 10 and 11 are formed by cutters 20 and 21. Optionally a punching operation could be provided. At the next stage, the material 12 is accordion folded by dies diagrammatically illustrated at 23 and 24 which respectively provide the bends about the lines or axes $a$ and $b$. The material 12 is intermittently advanced a distance corresponding to the dimension of a complete pattern, i.e. two strip widths, or a multiple thereof providing the cutter and bending die sets are similarly multiplied in number.

In Fig. 7 there is illustrated a process by the aid of which a conduit or electrical connection or any other device can be passed transversely through the cellular material. This is accomplished by drilling or punching holes 30 in the fluted strip material before it is bent. The holes are easily drilled by providing an operation stage somewhere in advance of the bending operation. When bending takes place, the holes 30 move into alignment, as illustrated in Fig. 8, and a conduit cable or any other elongate article can be passed through the cellular material.

Sheet covering material 40 and 41 is secured at the opposite sides of the structure illustrated in Fig. 8 to form an enclosure therefor. Similar sheet covering material may, of course, be provided in any of the other forms.

In Fig. 8, the bends 34 in the completed cellular material may lie above the cuts 35. This depends upon the thickness of the material relative to the dimensions of the cut. By providing rounded ends 33 at the cuts 32, as in Fig. 9, the outer corners of the bends 31 may ultimately be located in the same plane as the edges of the cut 32, as illustrated in Fig. 10 because the bends cause transverse bowing which reduces the height at the bend. This may be considered in connection with placement and securing of thin metal skin over the cell core material.

An desired cellular configuration can be provided. It is only necessary that the strip material prior to bending be generally fluted. In Fig. 11 there is illustrated a cell which is generally rectangular in configuration; in Fig. 12 a generally diamond-shaped cell configuration is provided; and in Fig. 13 a circular cell arrangement is provided by a generally sinuously fluted strip material.

The inventor claims:

1. The process of manufacturing cellular material from fluted or channeled stock having crests and troughs, which comprises: providing a series of longitudinally spaced sets of transverse cuts in the material, first alternate sets of cuts extending across the troughs, and the other alternate sets extending across the crests; rounding and enlarging the ends of the cuts; and then accordion bending the material along lines in transverse alignment with the cut sets, the rounding and enlarging of the ends of the cuts causing the crests of the bends and the edges of the cuts contiguous thereto to fall in a common plane upon bending of the material.

2. The continuous step process of manufacturing cellular material, which comprises: intermittently advancing flat stock material; forming the material into a longitudinally fluted or channeled configuration at a first stage; providing a set of transverse cuts through the troughs of the material and providing an adjacent set of transverse cuts through the crests of the material all at a second stage; and bending the material in sinuous fashion at a third stage.

References Cited in the file of this patent

UNITED STATES PATENTS

| | | |
|---|---|---|
| 1,389,294 | Dean | Aug. 30, 1921 |
| 2,018,085 | Offe | Oct. 22, 1935 |
| 2,441,081 | Perry | May 4, 1948 |
| 2,609,068 | Pajak | Sept. 2, 1952 |
| 2,708,958 | Drafton | May 24, 1955 |